US007827135B2

(12) United States Patent
Leff et al.

(10) Patent No.: US 7,827,135 B2
(45) Date of Patent: Nov. 2, 2010

(54) METHOD AND APPARATUS FOR RELAXED TRANSACTIONAL ISOLATION IN A CLIENT-SERVER CACHING ARCHITECTURE

(75) Inventors: Avraham Leff, Spring Valley, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/334,320

(22) Filed: Dec. 31, 2002

(65) Prior Publication Data

US 2004/0128328 A1 Jul. 1, 2004

(51) Int. Cl.
*G06F 7/00* (2006.01)
*G06F 17/00* (2006.01)

(52) U.S. Cl. .................................... 707/610; 707/955

(58) Field of Classification Search .................... 707/8, 707/102, 610, 955, 999.201, 999.008
See application file for complete search history.

(56) References Cited

U.S. PATENT DOCUMENTS 6,073,139 A * 6/2000 Jain et al. .................. 707/203
6,269,373 B1 * 7/2001 Apte et al. .................. 707/10
6,298,478 B1 * 10/2001 Nally et al. ................ 717/170
6,457,065 B1 * 9/2002 Rich et al. ................. 719/328
6,999,956 B2 * 2/2006 Mullins ....................... 707/2
2002/0116403 A1 * 8/2002 Weedon ...................... 707/201
2002/0116457 A1 * 8/2002 Eshleman et al. ........... 709/203
2002/0156702 A1 * 10/2002 Kane ........................... 705/27
2003/0135509 A1 * 7/2003 Davis et al. ................ 707/100

OTHER PUBLICATIONS

Interim Guidelines for Examination of Patent Applications for Patent Subject Matter Eligibility; Annex IV; pp. 50-57; Nov. 22, 2005.*
A. Leff et al., "Enterprise JavaBeans and Microsoft Transaction Server: Frameworks for Distributed Enterprise Components," Advances in Computers, Academic Press, vol. 54, pp. 99-152, 1999.
M.J. Franklin et al., "Transactional Client-Server Cache Consistency: Alternatives and Performance," ACM Transactions on Database Systems, vol. 22, No. 3, pp. 315-363, Sep. 1997.
K. Amiri et al. "On Space Management in a Dynamic Edge Data Cache," Fifth International Workshop on the Web and Databases (WebDB 2002), Jun. 2002, 6 pages, Madison, WI.
J. Gwertzman et al., "World-Wide Web Cache Consistency," Proceedings of the 1996 USENIX Technical Conference, Jan. 1996, pp. 141-152, San Diego, CA.
Q. Luo et al., "Middle-Tier Database Caching for e-Business," Proceedings of the 2002 ACM SIGMOD International Conference on Management of Data, 2002, pp. 600-611, Madison, WI.

* cited by examiner

*Primary Examiner*—John R. Cottingham
*Assistant Examiner*—Kimberly Lovel
(74) *Attorney, Agent, or Firm*—Kenneth R. Corsello; Ryan, Mason & Lewis, LLP

(57) ABSTRACT

Techniques are provided which enable relaxed transactional isolation and optimistic concurrency control in a distributed client-server architecture, and which address the problems of server overloading and network delays known to exist in conventional distributed client-server architectures. In particular, the invention preferably provides client-side caching techniques which advantageously serve to reduce server overloading and effects of network delay.

35 Claims, 7 Drawing Sheets

102-1
WEB BROWSER
104-1
SERVLET ENGINE
getValue()
SERVLETS JSPs
findByPrimaryKey(42)
100
106
ENTERPRISE JavaBean SERVER
PERSISTENT HOME
42
102-2
WEB BROWSER
104-2
SERVLET ENGINE
getValue()
SERVLETS JSPs
findByPrimaryKey(42)
108
DATABASE SERVER
RELATIONAL TABLE
42

100
106
ENTERPRISE JavaBean SERVER
PERSISTENT HOME
42
108
DATABASE SERVER
RELATIONAL TABLE
42
104-1
SERVLET ENGINE
getValue()
SERVLETS JSPs
findByPrimaryKey(42)
104-2
SERVLET ENGINE
getValue()
SERVLETS JSPs
findByPrimaryKey(42)
102-1
WEB BROWSER
102-2
WEB BROWSER 200
204
206
208
202
WEB BROWSER
SERVLETS
JSPs
findByPrimaryKey(42)
getValue()
SLI HOME
42
42
TRANSIENT HOME (CACHE)
REPLICATED EJB HOME(S)
42
CACHE-MISS AND
OPTIMISTIC COMMIT LOGIC
42
PERSISTENT
HOME
DATABASE SERVER
RELATIONAL TABLE
42

400
406
CACHE-MISS AND OPTIMISTIC
COMMIT LOGIC
DIRECT-TO-JDBC
IMPLEMENTATION
408
DATABASE SERVER
RELATIONAL TABLE
42
42
404
SERVLETS
JSPs
findByPrimaryKey(42)
getValue()
SLI HOME
42
TRANSIENT HOME (CACHE)
42
REPLICATED EJB HOME(S)
402
WEB BROWSER 500
504
getValue()
findByPrimaryKey(42)
SERVLETS
JSPs
SLI HOME
42
TRANSIENT HOME (CACHE)
REPLICATED EJB HOME(S)
CACHE-MISS AND OPTIMISTIC
COMMIT LOGIC
DIRECT-TO-JDBC
IMPLEMENTATION
506
DATABASE SERVER
RELATIONAL TABLE
502
WEB BROWSER 600
604
BACK-END SERVER
EJB HOME(S)
SHORT-RUNNING TRANSACTION MANAGER
EDGE-TRANSACTION MANAGER
4
5
COMMIT
42
PERSISTENT HOME
3
EJB MEMENTOS
BEFORE/AFTER
42
HTTP
602
EDGE SERVER
SERVLETS
JSPs
COMMIT
1
EDGE-TRANSACTION MANAGER
REPLICATED EJB HOME(S)
SLI HOME
42
2
TRANSIENT HOME (CACHE)
42

METHOD AND APPARATUS FOR RELAXED TRANSACTIONAL ISOLATION IN A CLIENT-SERVER CACHING ARCHITECTURE

FIELD OF THE INVENTION

The present invention generally relates to application-based transaction processing in a distributed client-server architecture and, more particularly, to techniques for enabling relaxed transactional isolation in a distributed client-server caching architecture.

BACKGROUND OF THE INVENTION

In distributed client-server environments in which one or more client devices or machines (clients) interact with an application (i.e., a computer software program written to perform particular functions in accordance with client interaction) in association with one or more server devices or machines (servers), it is known that such servers often become overloaded. It is also known that long network delays often result between clients and servers in distributed systems since paths between clients and servers involve wide area networks formed across geographically separated portions of the system.

This is also the case in the J2EE (Java 2 Platform Enterprise Edition from Sun Microsystems) environment. As is known, the J2EE environment is a three-tier environment. User machines form one tier, an enterprise's (e.g., company, organization, etc.) database servers and legacy information systems (back-end servers) form another tier, and application servers form a middle tier between the user machines and the back-end servers. In the J2EE environment, an application server contains both Enterprise JavaBean (EJB) clients and EJB servers, typically in the same address space in the same machine. The EJB servers are considered "database clients" (e.g., so-called Java Database Connectivity (JDBC) clients) of the back-end servers. Thus, as is known, the back-end servers in the J2EE environment also become increasingly overloaded, because it is much more difficult to replicate the back-end servers than to replicate the application servers.

In addition, Internet-based distributed systems usually involve some high-latency paths where communication occurs between geographically distributed system components. Typically the high-latency path is between the user and the application server, although "edge server" architectures move some or all of the application server near the user (e.g., to the Internet Service Provider), which places the high-latency path between the application server and the back-end servers.

As a result of both of these reasons, application performance decreases since a client (e.g., EJB server or otherwise) must typically access the back-end server whenever the client needs data.

Furthermore, it is known that transactions associated with applications created for the J2EE environment, similar to CORBA (Common Object Request Broker Architecture from the Object Management Group) transactions, attempt to satisfy the so-called ACID (Atomic, Consistent, Isolated, Durable) properties as described in J. Gray et al., "Transaction Processing: Concepts and Techniques," Morgan Kaufmann, 1993. Thus, a transaction may employ semantics that serve to satisfy the ACID properties such that the transaction is considered to be atomic (e.g., all or nothing), consistent (e.g., no interim state of the data), isolated (e.g., does not affect or is not affected by other transactions) and durable (e.g., will complete if system fails or can be reversed).

Without transactional semantics, concurrent clients will "step on" one another's data modifications with respect to an application. However, existing application approaches provide very strict isolation between transactions, e.g., so-called "serializable" or "degree-3" isolation. In particular, this is the case with existing caching approaches. Such strict isolation can further add to performance problems between clients (e.g., EJB servers) and servers (e.g., back-end servers).

Accordingly, there is a need for techniques which enable relaxed transactional isolation and optimistic concurrency control in a distributed client-server architecture, and which address the problems of server overloading and network delays known to exist in conventional distributed client-server architectures.

SUMMARY OF THE INVENTION

The present invention provides techniques which enable relaxed transactional isolation and optimistic concurrency control in a distributed client-server architecture, and which address the problems of server overloading and network delays known to exist in conventional distributed client-server architectures. In particular, the invention preferably provides client-side caching techniques which advantageously serve to reduce server overloading and effects of network delay.

In one aspect of the invention, a technique for processing data for use in a database server in a distributed system comprises the following steps/operations. First, data sent from an application server in the distributed system, which executes an application associated with data stored on the database server, is received by the database server. Then, the database server processes the received data in accordance with the data stored thereon, wherein the processing of the received data is performed in accordance with an optimistic concurrency control process and a relaxed isolation level.

The received data may comprise a first data set and a second data set, the first data set being in a state representative of data at a time that the data was originally sent to the application server from the database server (e.g., before-image), the second data set being in a state representative of data at a time that the data was sent from the application server to the database server (e.g., after-image). Current data stored at the database server may then be updated in response to the first data set and the second data set.

For example, the updating operation may comprise verifying that the current data stored at the database server is identical to the first data set and the second data set, when the first data set is identical to the second data set. Also, the updating operation may comprise verifying that the current data stored in the database server is identical to the first data set, and updating the current data stored at the database server with the second data set, when the first data set is different than the second data set. Further, the updating operation may comprise creating data at the database server using the second data set, when the first data set is null. Still further, the updating operation may comprise deleting the current data stored at the database server, when the second data set is null.

Preferably, the application server maintains the first data set and the second data set in accordance with a cache. In a preferred embodiment, the database server and the application server operate in an Enterprise JavaBean (EJB) application environment. Thus, in the EJB environment, the application server may maintain data via caching, such that the caching is substantially transparent to an EJB client application.

In another database server embodiment, the data received by the database server may comprise a data set being in a state representative of data at a time that the data was sent from the application server to the database server. In this case, current data stored at the database server may be updated in response to the received data set and data maintained at the database server in a state representative of data at a time that the data was originally sent to the application server from the database server.

In another aspect of the invention, a technique for processing data for use in an application server in a distributed system comprises the following steps/operations. The application server executes an application associated with data stored on a database server in the distributed system. Further, the application server maintains data in accordance with the execution of the application such that an optimistic concurrency control process and a relaxed isolation level are substantially realized in accordance with the data stored on the database server. In preferred embodiments, the application server may maintain a cache to store data and the application server may be an edge server.

These and other objects, features and advantages of the present invention will become apparent from the following detailed description of illustrative embodiments thereof, which is to be read in connection with the accompanying drawings.

DESCRIPTION OF THE PREFERRED EMBODIMENTS

Figure 1:
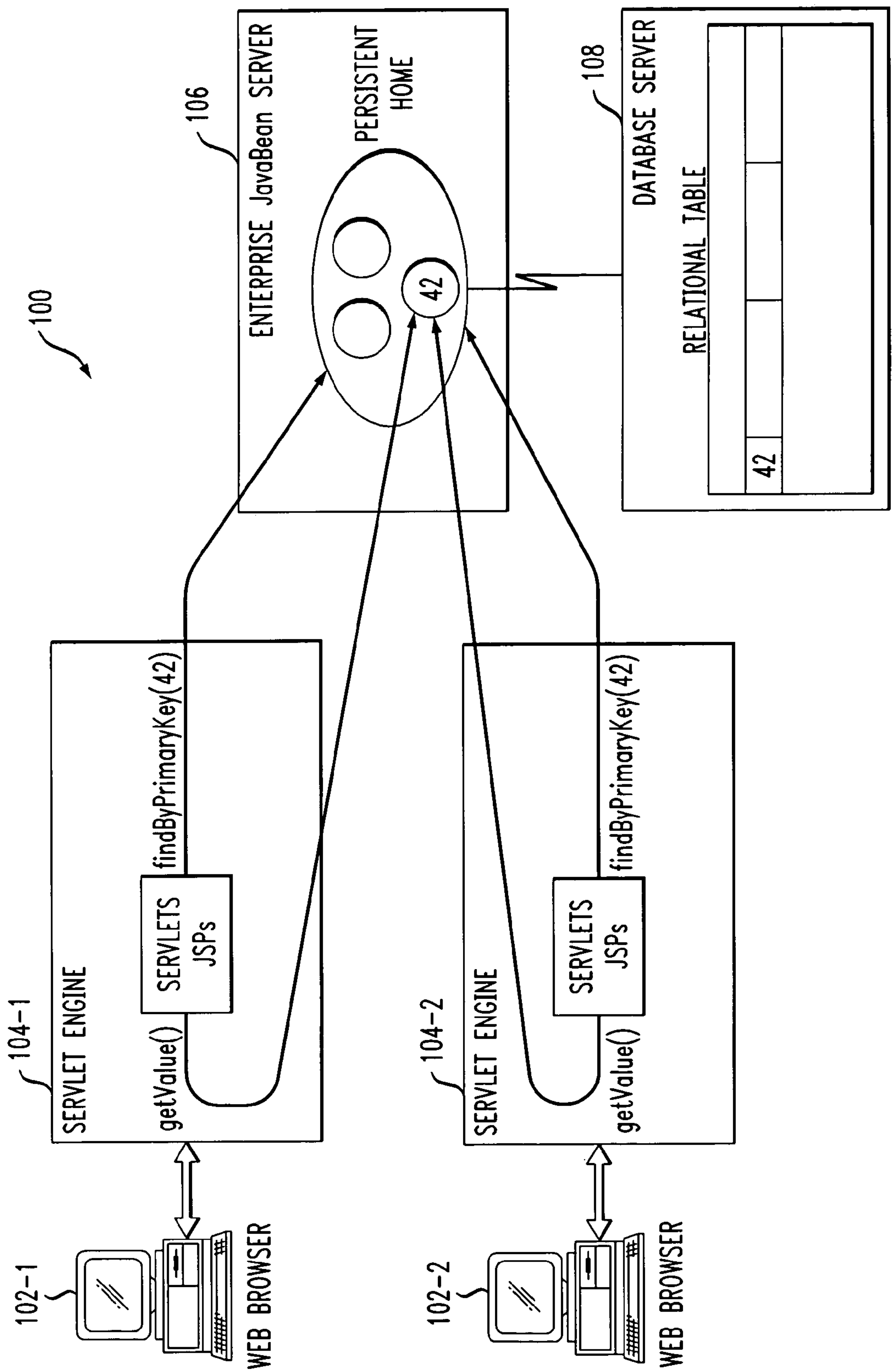
FIG. 1 is a block diagram illustrating a typical J2EE runtime environment.

The present invention will be explained below in the context of an illustrative J2EE or Enterprise JavaBean application environment. However, it is to be understood that the present invention is not limited to such a particular application environment. Rather, the invention is more generally applicable to any framework for distributed enterprise components in which it is desirable to reduce application latency and/or increase system throughput. Also, while the invention may operate with respect to data objects (e.g., processing and caching data objects), the invention is not limited to use with such a data type, but rather is more generally applicable to any data type.

As will be explained below, in an illustrative embodiment, the present invention provides an Enterprise JavaBeans (EJBs) caching architecture. Such a caching architecture greatly improves application throughput. Throughput is improved because data serving is offloaded from the database server to a cache-enabled application server. An important feature of the inventive architecture is that the caching function is transparent to applications that use it. The cache-enabled application server uses the same (EJB) programming model, and the same transactional semantics, as provided by non-caching architectures.

As is known, Enterprise JavaBeans (EJBs) serve as a component model for enterprise applications. We refer here to the “entity bean” flavor of EJBs, in contrast to the “session bean” flavor. Like CORBA and DCOM (see Richard Grimes, “Professional Dcom Programming,” Wrox Press Inc., 1997), EJBs are a distributed component model and, as such, encapsulate both “data” (the component's state) and “code” (business logic in the component's methods). In addition, EJBs automatically supply common requirements of enterprise applications such as persistence, concurrency, transactional integrity, and security. Bean developers focus on the business logic of their application. When deployed to an EJB container, the components are embedded in an infrastructure that automatically supplies the above requirements. For example, the deployer might specify that an Employee Entity bean's state is backed by persistent storage in the HR relational database, specifically in its Employees table. EJBs use declarative transaction management on a per-method basis, so that the incrementSalary method might be declared to require a transactional scope, using the Repeatable Read transaction isolation level.

It is to be understood that while the illustrative embodiment relates to EJB technology, the invention applies more generally to any framework for distributed enterprise components. By way of example, the inventive techniques may be implemented in the framework disclosed in A. Leff et al., “Enterprise JavaBeans and Microsoft Transaction Server: Frameworks for Distributed Enterprise Components,” Advances in Computers, Academic Press, vol. 54, pp. 99-152, 1999, the disclosure of which is incorporated by reference herein.

As a component model, EJBs offer the benefits of location independence with respect to the programming API (application programming interface). When coding, developers can completely ignore issues about where the application and its components will run because, at runtime, the component middleware transparently instantiates the required components. Unfortunately, since the instantiated components are bound to a single process (or “machine,” or “server group”), such location independence is actually an illusion from a performance point of view.

Referring initially to FIG. 1, a block diagram illustrates a typical J2EE runtime environment. As shown, the illustrative J2EE environment 100 comprises web browsers 102-1 and 102-2, servlet engines 104-1 and 104-2, EJB server 106 and database server 108. Of course, the environment may comprise more or less browsers and servlets, and more EJB servers and database servers. Typically, for example, a J2EE application is deployed such that the user interacts with the application through a web-browser (102-1 or 102-2), the browser interacts with a servlet (104-1 or 104-2), the servlet invokes methods on EJBs (in accordance with Java Server Pages or JSPs), and the EJBs' persistent state associated with the EJB server 106 is stored in a relational database associated with the database server 108. However, the distance (both in address-space crossings and code pathlength) between a user and the data can thus be quite large.

Since the system components are statically fixed at runtime to specific machines, each time that a web-client interacts with the application, multiple client/server interactions must be performed since a component's Home and instances do not reside on the client. As is known, EJB Homes typically provide two functions: (1) they are "factories" for EJBs (e.g., they are used to create and delete them); and (2) they provide a scope for query operations. For example, if you wanted to search for blue-car EJBs, you are forced to search within exactly one EJB Home, and the search scope is all the EJBs that were created by that Home. So create/delete/query operation methods are found on the Homes, and read/write state methods are found on the EJBs.

The fact that EJBs have runtime location dependence has important implications for application performance and system scalability. First, because EJBs (once bound to a particular server) cannot be moved to another server, performance suffers because of the communication latency incurred when one process or machine sends method requests or returns data to another. Second, if many clients access those components, the server becomes a system "hot-spot" (limiting system scalability) since those EJBs cannot be offloaded to less utilized servers.

In accordance with principles of the present invention, application performance and system scalability is improved by enhancing EJB application servers with a cache capability. The EJBs' persistent state continues to reside on a database server, but transient versions of that state are cached on the application server itself. It is to be understood that cached versions may alternatively be persistent, rather than transient. Several such "cache-enhanced" application servers may be deployed at the same time, all maintaining persistent state on the same database server. Application components may therefore reside closer to the application and overall system load may be spread over multiple cache-enhanced application servers.

Some advantages of the EJB caching technique of the invention are as follows. EJB caching handles read/write data as well as read-only data. EJB caching provides transactional consistency among the cached replicas. As will also be explained in greater detail below, EJB caching enables relaxed transactional isolation. Application developers or users do not have to modify existing applications in order to improve performance. There is no need to maintain two programming models; one for non-cache-enabled applications, and one for cache-enabled applications. No new application component model is introduced, but instead the EJB model of session and entity beans is used. Although the runtime of a cache-enabled application server differs from standard J2EE application servers, the application developer does not write new code to access the runtime. Instead, tooling takes standard EJBs as input and produces cache-enabled EJB implementations with the same Java interface as output. The cache-enabled version of the EJBs support the same transactional model as described in the EJB specification. Thus, concurrency and transactional isolation are provided.

The following description will further explain the principles of the present invention in the context of the illustrative EJB environment. The description will be followed by a description of four illustrative system architectures which implement the inventive principles, followed by an explanation of how the four implementations differ from one another.

In accordance with the invention, a system architecture substitutes Single Logical Image (SLI) Home and bean implementations for the vanilla, JDBC (Java Database Connectivity) Home and bean implementations used in the non-cache-enabled application. The caching runtime copies the state of the relevant persistent EJBs into transient EJBs as necessary, and then transparently delegates client invocation to these beans. The SLI bean introduces no business logic of its own. The SLI bean simply delegates all method invocations to the transient bean. Because the transient bean implements the same interface as the original bean, and differs only in the way it accesses its datastore, the business logic of the application is unchanged.

Since the EJB specification requires that EJBs cannot be serialized via the Java Serialization framework, the invention provides "value objects," encapsulating the state variables of an EJB, that can be Serialized and passed between address spaces. These value objects are termed "mementos." Mementos have the same notion of "identity" as EJBs, as they support the getPrimaryKey method. Transient EJBs introduce two memento-related methods: create(Memento) (on the EJB home) so that they can be created from persistent state; and getMemento( ) (on the Remote interface) so that the caching runtime can access the updated state of the Transient EJB in order to update the persistent state from the client's cached state.

The memento containing the state at the beginning of a transaction is called the before-image, while the memento containing the state at the transaction's end is called the after-image. The cache-enhanced application server maintains a transient (memory-resident) datastore of memento instances. In addition to create(Memento) and getMemento( ), the persistent EJBs require an updateFromMemento(Memento) method in order to update the persistent state at commit time.

The EJB container that manages the transient and SLI Homes may be a standard container. The SLI and transient beans are fully compliant EJBs with Remote and Home interfaces and a Bean implementation. They differ from the familiar persistent, JDBC, beans only in that they use a transient datastore when loading and storing bean state. A SLI and associated transient bean share a common identity because getPrimaryKey returns the same value. This value is identical to that returned by the persistent bean in the original application.

Thus, an EJB cache may be populated in one of the following ways:

(1) Direct application access using the bean's primary key, via an ejbload or findByPrimaryKey invocation.

In this case, the cache runtime first determines whether the bean is already cached. If a cache miss occurs, the cache runtime fetches the before-image directly from the persistent datastore and caches it for subsequent use.

(2) Indirect application access, when the bean is part of the result set returned by a custom finder method invocation.

Unlike a direct access, the cache runtime first runs the query against the persistent datastore, because only that datastore is guaranteed to have the entire (potential) result set available. The result set returned by the persistent datastore is then used to populate the cache. However, in order to guarantee that the application sees its prior updates, the runtime ensures that result set elements that were cached prior to the custom finder invocation are not overlaid by the current persistent state. Finally, with the persistent finder's entire result set available in the cache, the custom finder is run against the transient Home, and that result is returned to the application.

Other transactions may commit their state to the persistent datastore while a given transaction executes on a cache-enhanced application server. This implies that the process used to implement custom finders may return additional EJBs on subsequent invocations within the same transaction. This is one example where the relaxed isolation semantics differ from the strict serializable isolation semantics; the latter would require that subsequent identical queries within the same transaction return exactly the same results. The serializable isolation guarantees are expensive to implement, and typically not needed by applications anyway.

(3) Explicit bean creation by the application.

In this case, the appropriate create method is invoked on the SLI home, delegated to the transient Home, and the resulting bean is cached.

Populating a transient EJB cache is only one part of an EJB caching architecture. The system should also provide transactional semantics identical to that provided by a non-cache-enabled runtime to a J2EE application. Because the invention allows inter-transaction caching (i.e., to allow EJBs cached by one transaction to be available to other, concurrent and subsequent, transactions), the system preferably uses optimistic concurrency control rather than pessimistic concurrency control.

Optimistic concurrency control works under the (optimistic) assumption that conflicts between concurrent transactions are relatively rare. So optimistic concurrency control involves methodologies that check "at the last second" before commit that no isolation failure has occurred. The present invention accomplishes this by checking to make sure that all the before-images match the current state of the shared persistent back-end database. If all the EJBs that the transaction accessed are still the same in the database at commit time, then no other transaction committed changes to those EJBs. This is sufficient to insure that the transactions are isolated.

Pessimistic concurrency control works under the (pessimistic) assumption that conflicts between concurrent transactions are relatively common. Thus, pessimistic methodologies typically work with locks. The first transaction that needs to access something acquires the lock on the given EJB. Subsequent transactions will be delayed until the first transaction commits (locks are released at commit time). Under the pessimistic approach, locking operations must be propagated to the database server, countering the offload benefits of caching. Also, in the EJB programming model, it is difficult for the container runtime to know whether a shared or exclusive lock is required for a given data access. For further concurrency control discussions, see, e.g., M. J. Franklin et al., "Transactional Client-Server Cache Consistency: Alternatives and Performance," ACM Transactions on Database Systems, vol. 22, no. 3, pp. 315-363, September 1997, the disclosure of which is incorporated by reference herein.

In accordance with the invention, a common transient store is preferably maintained alongside a per-transaction transient store. When a direct-access operation results in a cache miss on the per-transaction store, the common store is checked for a copy of the EJB data before an attempt is made to access the persistent EJB. Since each cache-enabled application server maintains its own common transient store, the "conflict window" (i.e., the period of time in which an application's persistent state can be concurrently modified by some other transaction) may widen.

Just as the original application's JDBC Homes and beans is replaced with their SLI equivalents, the original pessimistic JDBC Resource Manager is replaced with an optimistic SLI Resource Manager. Whenever the cache runtime must access the persistent EJBs (in any of the "populate" scenarios discussed above), it creates a separate (non-nested) short database transaction for the duration of the access. This transaction is committed immediately after the access completes so that locks are released quickly by the persistent store. The application-generated transactions are thus decoupled from the datastore transactions used to provide data to the cache and update data from the cache. A single application transaction thus typically brackets multiple persistent datastore transactions. Finally, when the application transaction running on the cache-enabled application server commits, a persistent datastore transaction is run to commit the application's state changes.

The isolation semantics provided to the application are the following. If another transaction, $t_2$, modifies the persistent datastore's data from the state that existed at the beginning of the application's transaction $t_1$, $t_1$ will be aborted. This behavior may be implemented by comparing the before-image of every bean accessed in the transaction to the current corresponding image in the datastore at commit time. Only if no conflicts exist are $t_1$'s EJBs committed to the datastore. During a successful commit, the transaction's set of after-image mementos are written to the datastore in a single datastore transaction. That is, if the application creates an EJB, the system also verifies that no EJB with the same key exists at commit time. Similarly, if the application removes an EJB, the system also verifies that the current-image still exists before deleting it and committing the transaction.

Figure 2:
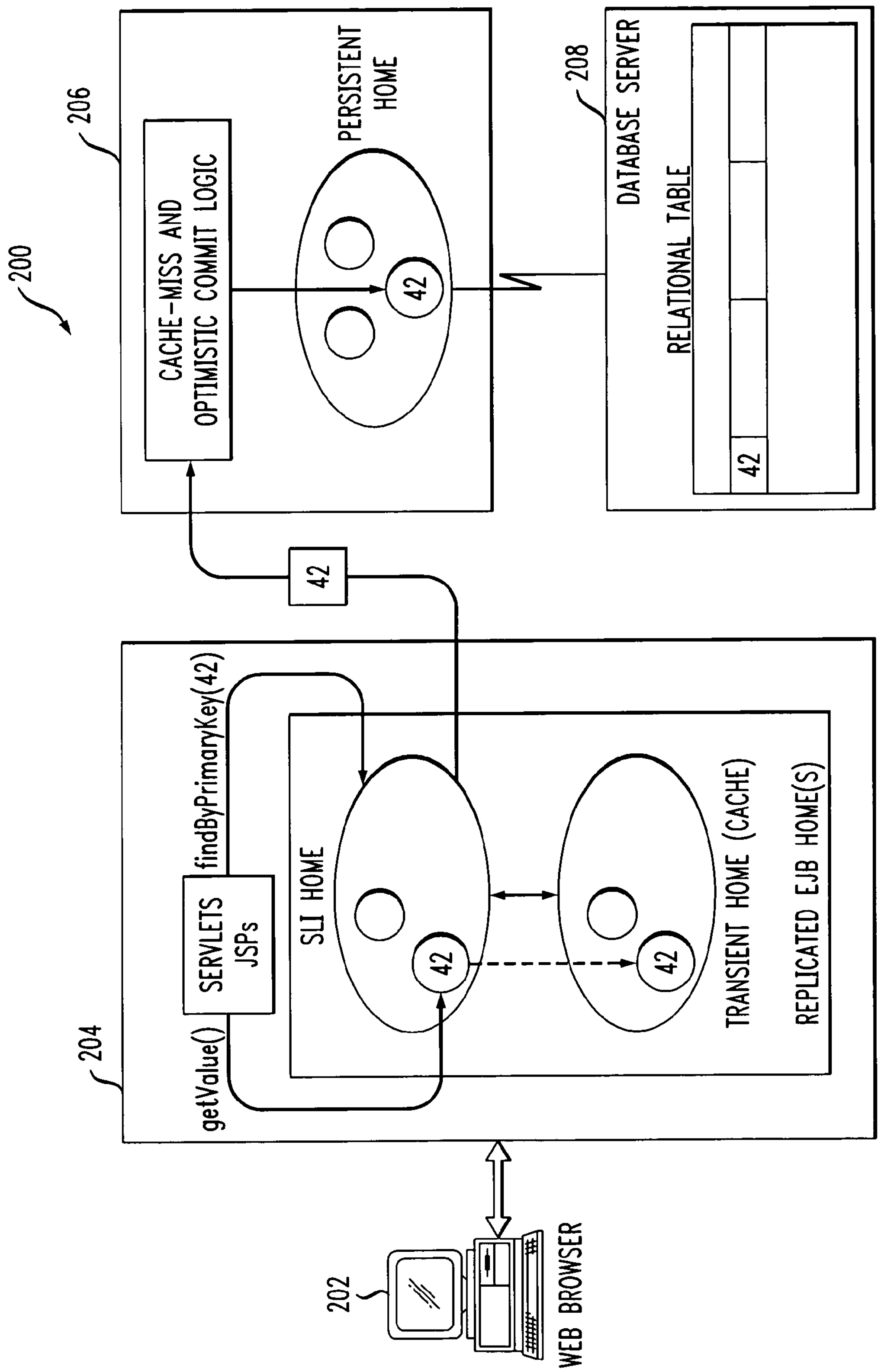
FIG. 2 is a block diagram illustrating a split-server persistent EJB caching implementation according to the present invention.
Figure 3:
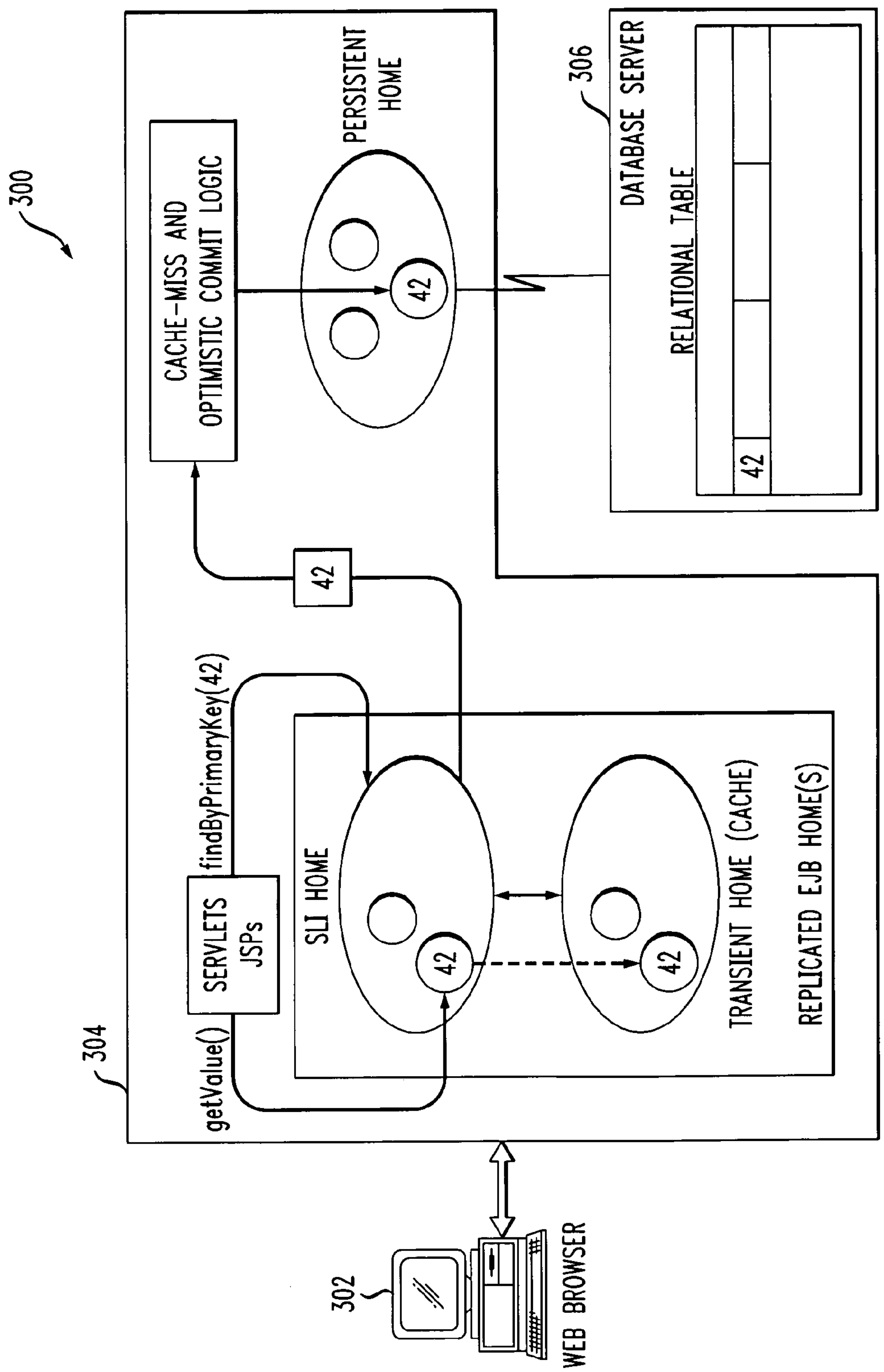
FIG. 3 is a block diagram illustrating a combined-server persistent EJB caching implementation according to the present invention.
Figure 4:
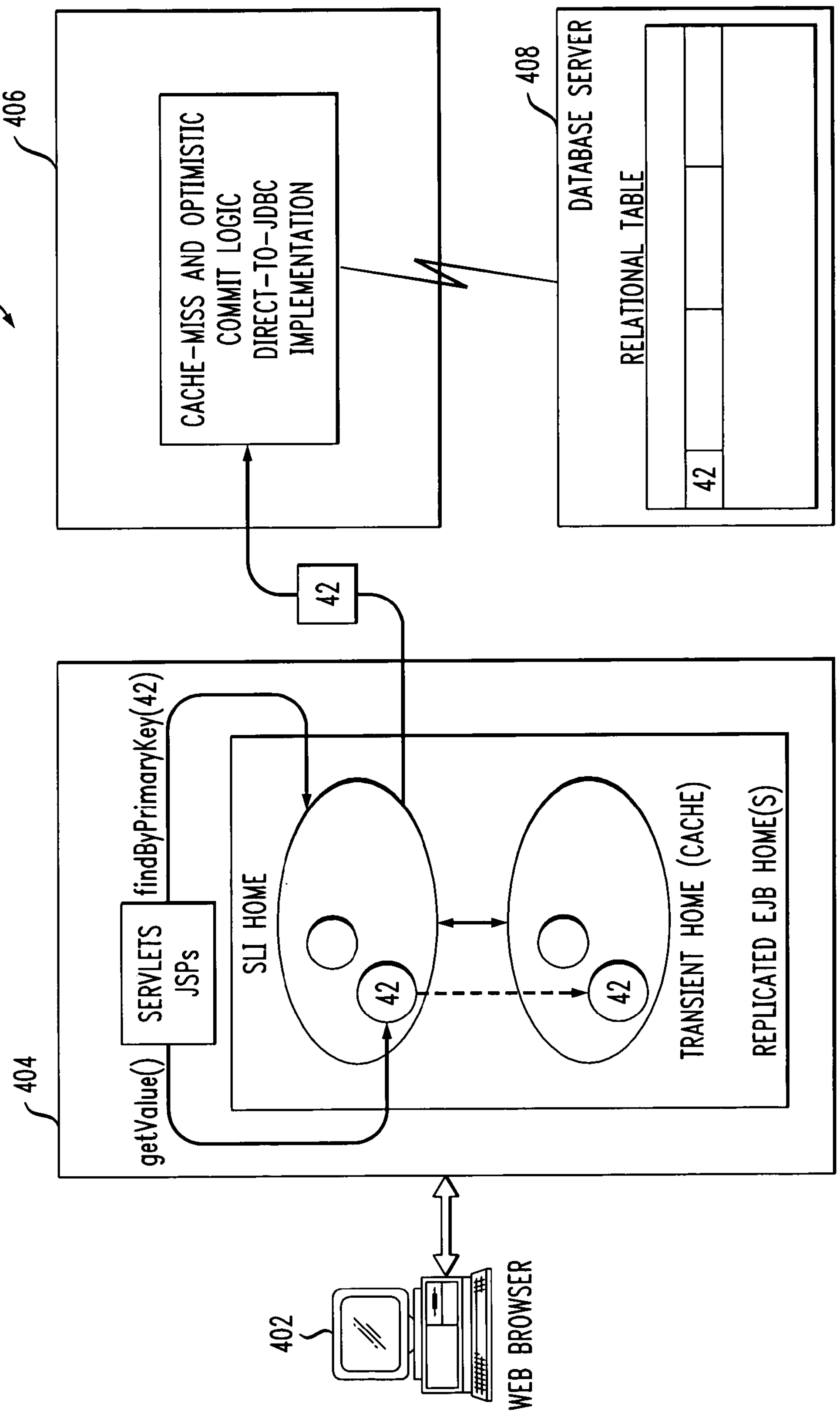
FIG. 4 is a block diagram illustrating a split-server direct-to-JDBC caching implementation according to the present invention.
Figure 5:
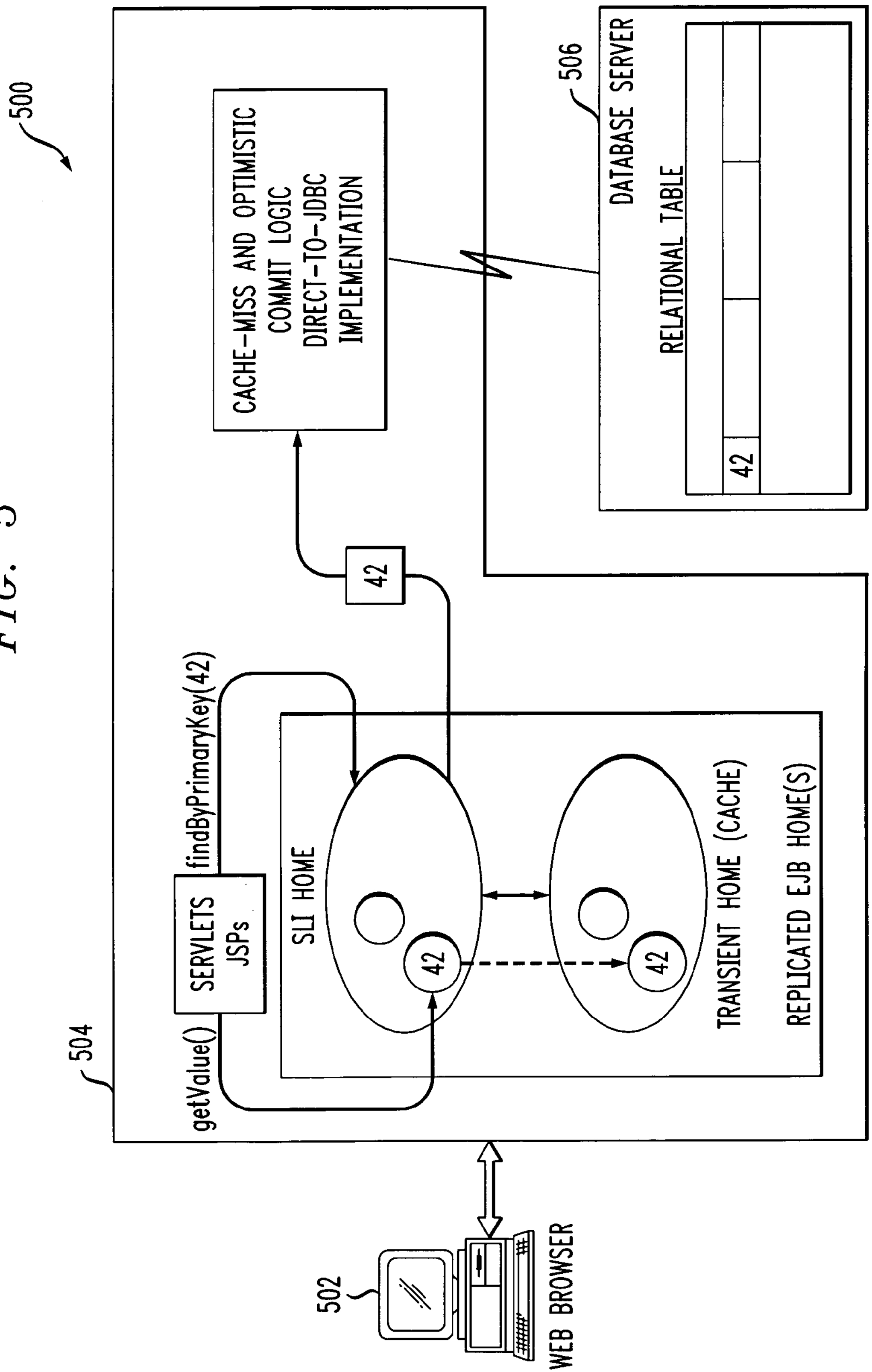
FIG. 5 is a block diagram illustrating a combined-server direct-to-JDBC caching implementation according to the present invention.

Given the above description of the principles of the present invention, a description of four illustrative implementations will now be given in the context of FIGS. 2-5. FIG. 2 depicts a split-server persistent EJB implementation, while FIG. 3 depicts a combined-server persistent EJB implementation. FIG. 4 depicts a split-server direct-to-JDBC implementation, while FIG. 5 depicts a combined-server direct-to-JDBC implementation.

FIG. 2 illustrates a block diagram of a split-server persistent EJB system according to the present invention. As shown, the system 200 comprises a web browser 202, a cache-enabled application server 204, a back-end application server 206 and a database server 208. The implementation is considered a split-server implementation since the cache-enabled application server 204 is remote from the back-end application server 206. As with any of the elements shown in the drawings, the servers may be coupled via any suitable network, e.g., private, public, or otherwise.

As shown, an application deployed to the cache-enhanced application server 204 is comprised of SLI and transient versions of the set of application Homes and beans (the Homes are depicted by the ovals with the beans being depicted by the circles within the ovals.

FIG. 3 illustrates a block diagram of a combined-server persistent EJB system according to the present invention. As shown, the system 300 comprises a web browser 302, a cache-enabled application server 304 and a database server 306. The implementation is considered a combined-server implementation since back-end server functions are merged in the cache-enabled application server 304, i.e., there is no back-end application server remote from the cache-enabled application server.

FIG. 4 illustrates a block diagram of a split-server direct-to-JDBC system according to the present invention. As shown, the system 400 comprises a web browser 402, a cache-enabled application server 404, a back-end application server 406 and a database server 408. Again, the implementation is considered a split-server implementation since the cache-enabled application server 404 is remote from the back-end application server 406.

Lastly, FIG. 5 illustrates a block diagram of a combined-server direct-to-JDBC system according to the present invention. As shown, the system 500 comprises a web browser 502, a cache-enabled application server 504 and a database server 506. Again, the implementation is considered a combined-server implementation since back-end server functions are merged in the cache-enabled application server 504, i.e., there is no back-end application server remote from the cache-enabled application server.

As is evident, each of the application servers illustrated in FIGS. 2 through 5, namely, application servers 204, 304, 404 and 504, maintain a cache such that the state of relevant persistent EJBs are copied into transient EJBs, as necessary, and then client invocations are transparently delegated to these beans (e.g., bean #42 in each figure). Advantageously, the SLI bean introduces no business logic of its own. The SLI bean simply delegates all method invocations to the transient bean. Because the transient bean implements the same interface as the original bean, and differs only in the way it accesses its datastore, the business logic of the application is unchanged.

Differences between the implementations of FIGS. 2 through 5 will now be explained.

(1) Derivation of transient EJB state.

In the persistent EJB implementations (FIGS. 2 and 3), every transient EJB is associated with a corresponding persistent (vanilla) EJB residing on the back-end application server. The mementos described above are extracted from the persistent EJB, and the persistent EJB, in turn, is populated by the back-end application server from the persistent database.

In the direct-to-JDBC implementations (FIGS. 4 and 5), every transient EJB is associated with a row in a relational database table, specifically, the row specified by the primary key of the transient EJB. The mementos described above are extracted directly by the cache-enhanced application server from the database using standard APIs such as JDBC.

This dichotomy affects the architecture and methodologies but only at a relatively low-level. The direct-to-JDBC implementation may perform better because data are accessed without the indirection required by the persistent EJB implementation. Conversely, the back-end server may not expose the data directly in the manner required by the direct-to-JDBC.

(2) Location where logic used for cache miss processing and logic to commit the client-side transaction reside.

In the combined-servers implementation (FIGS. 3 and 5), this logic is combined with the cache-enhanced application server.

In the split-servers implementation (FIGS. 2 and 4), this logic resides on the back-end application server.

This dichotomy does not affect the caching architecture or methodologies, rather it relates only to the organization of the architecture and methodologies. The performance of one implementation versus the other depends on the environment and the problem to be solved. For example, the combined-servers implementation may perform better in a closely-coupled, low-latency, environment, where the major bottleneck for throughput performance is the database server. The split-servers implementation may perform better in an edge-server, high-latency, environment where the major bottleneck for good response time is the high latency between components of the distributed client-server system.

Accordingly, it is evident from the above illustrative EJB caching implementations that improved application performance is provided since data is located on the cache-enabled application server and need not be fetched from the database server thus avoiding network latency and server queuing delay. Because the system's middleware provides transactional semantics, the application does not have to devise its own transactional support on a case-by-case basis. This reduces application complexity and reduces the occurrence of errors arising from failure to correctly implement transactions.

As the application requests data, the data is acquired from the database server side and dynamically cached on the EJB client side (i.e., EJB server). Once the data is cached on the EJB client side, subsequent requests within the same transaction access the EJB client-side copy of the data, and avoid communication with the database server. The EJB client-side cache maintains the current state of the data ("after image"), and the original state of the data as it was retrieved ("before image").

At commit time, the before-images and after-images are transmitted to the database server, and a transaction is begun on the database server side. All the before-images are compared against the current state of the server database. If any differences are found, the EJB server and database server transactions are rolled back, because this would represent an isolation violation (since some other transaction must have modified the data during this client transaction). Otherwise, if the before-image is different from the after-image, the data on the database server is updated to match the after-image, and the EJB client-side and database server-side transactions are committed.

Queries executed by the client are executed against both the server-side database and the EJB client-side cache. The database server-side result is merged with the EJB client-side result, so that changes made on the EJB server during the current transaction are visible in the query result. In order to achieve serializable isolation, the query results would need to be re-checked at commit time to assure that no other transaction had caused the query-result to change. In contrast, a relaxed transactional isolation (e.g., repeatable-read) methodology of the invention provides for not re-checking query results at commit time. Although this may allow some serializability violations, the approach provides better performance because, for example: (1) the query results do not have to be saved and re-checked; and (2) fewer transactions are rolled-back due to "allowable isolation violations" which would be detected by the re-checks.

The relaxed isolation is further enhanced by implementing an "unlock" API on the EJB server, which allows the application to indicate that it does not require a verification of the before-image at commit time. Typically an application examines some data which turns out to be irrelevant to the application. The unlock API allows the application to indicate these situations.

Another approach is to do caching at the application level, using application-specific knowledge of the system behavior. However, the inventive approach is valid for any application behavior, and thus can be implemented by the middleware layer.

The inventive methodology is designed to support long-duration client-side transactions, so it uses a "detection" approach, where transactional conflicts are detected at commit time. An alternative approach is an "avoidance" approach, but such approaches require that locks are held on the server for the duration of the client transaction. Thus, the detection approach is preferred for long-duration transactions.

As is known, classic transaction systems provide so-called "degree-3" or "serializable" isolation. Slightly more relaxed isolation is "repeatable read" isolation, which the above-mentioned Gray et al. reference refers to as "degree 2.9999" isolation. The relaxation is that identical query operations may return more or fewer results during a transaction, because data records have been changed/created/deleted by other transactions. Thus you are not completely isolated from other transactions. Advantageously, the invention preferably provides "repeatable read" isolation in conjunction with optimistic concurrency control.

In the present invention, the relaxed isolation is a consequence of the fact that query operations are propagated back to the back-end server, and the back-end server does not share the transaction context with the cache-enhanced application server. Thus, subsequent queries see updates by other transactions that have committed on the back-end server. The conventional way of doing queries with optimistic isolation was to propagate all the index pages to the cache and query against those pages. However, all the after-images of the index pages must be validated, which can be costly.

Figure 6:
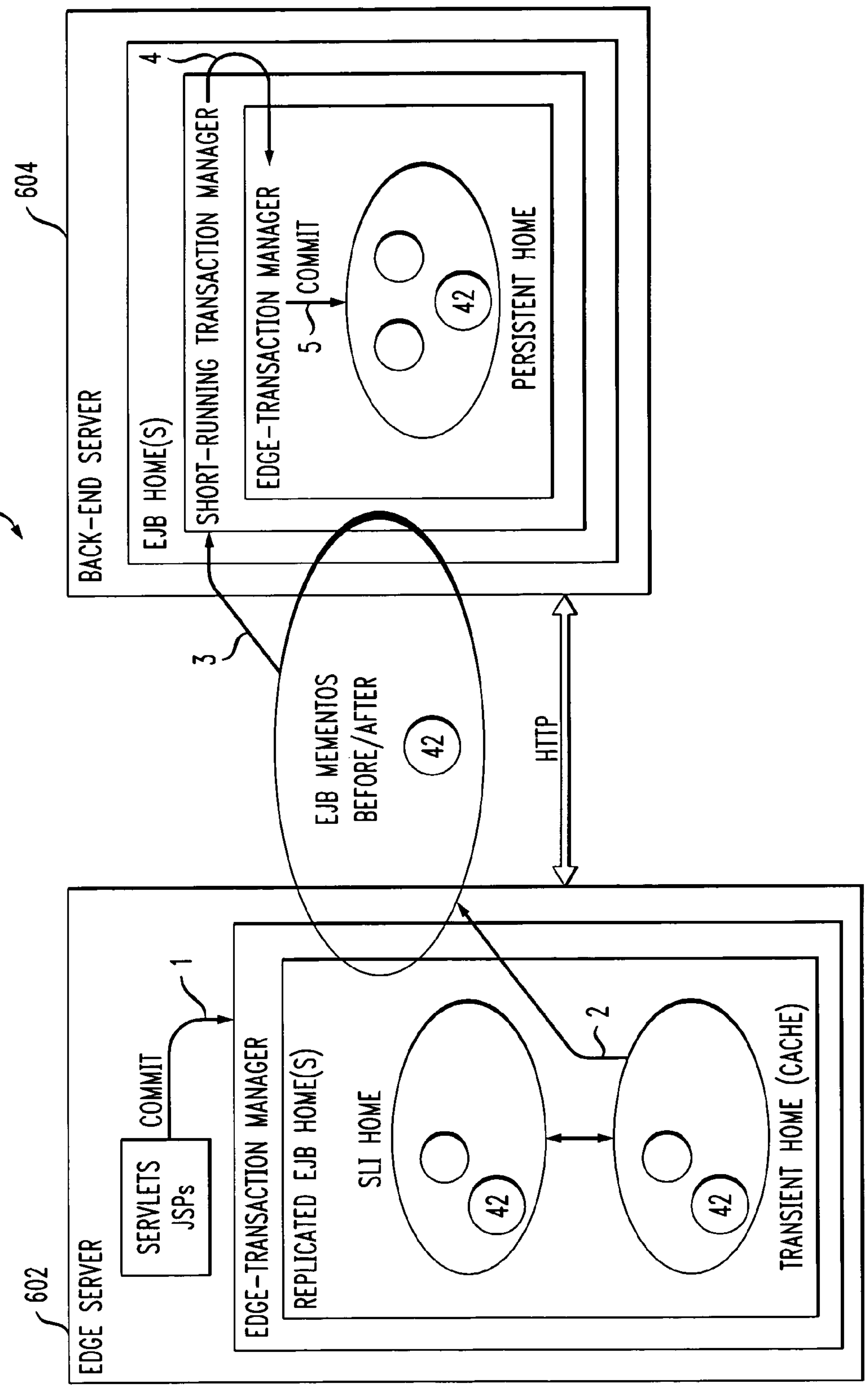
FIG. 6 is a flow diagram illustrating a transaction commit processing methodology implementing relaxed isolation in the context of an edge server embodiment of the invention.

FIG. 6 illustrates a flow diagram of a transaction commit processing methodology implementing relaxed isolation in the context of an edge server embodiment of the invention. The methodology 600 is performed between an edge server 602 (application server) and a back-end server 604.

The methodology 600 operates as follows:

(i) Edge-Transaction Commit Client-side:

During edge-running transaction, client SLI Home maintains before-image Memento data object (step 1).

Per EJB, per transaction:

At edge-transaction commit, client SLI Home creates after-image Memento (step 2).

For each EJB, send before-image/after-image pair to back-end server (step 3).

As an optional optimization, the back-end server may cache the before-image when it is sent to the edge-server, thus avoiding the communication overhead of returning it to the back-end server at commit time.

(ii) Edge-Transaction Commit Server-side:

Server-side edge-transaction manager iterates through Memento pairs (step 4 and 5):

Check persistent EJB not modified by another transaction before-Memento=persistent EJB Memento If before-Memento≠after-Memento update persistent EJB from after-Memento If before-Memento=null (create) Create persistent EJB from after-Memento If after-Memento=null (remove) Remove persistent EJB.

Figure 7:
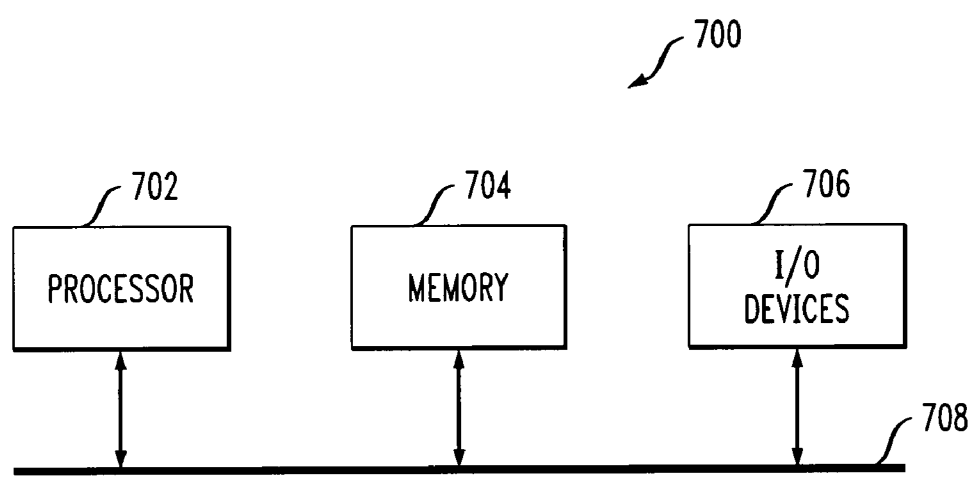
FIG. 7 is a block diagram illustrating an embodiment of a computing system that may be used to implement any of the client and server elements of the present invention.

Referring now to FIG. 7, a block diagram illustrates a computing system 700 that may be used to implement any of the client and server elements shown in FIGS. 2-6 (e.g., application server, back-end server, etc.). In this illustrative implementation, a processor 702 for implementing at least a portion of the methodologies of the invention is operatively coupled to a memory 704 and I/O devices 706 via a bus 708, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. For example, in the case of the application server, the memory 704 may be used to implement the EJB cache.

Furthermore, the term "I/O devices" as used herein is intended to include, for example, one or more input devices (e.g., keyboard, mouse, etc.) for entering data to the processor, and/or one or more output devices (e.g., keyboard, monitor, etc.) for presenting the results associated with the processor. Also, the term I/O devices may be considered as including a network interface suitable for enabling the computing device 700 to communicate with another computing device across a network.

It is to be appreciated that while the present invention has been described herein in the context of a network communication system, the methodologies of the present invention may be capable of being distributed in the form of computer readable media, and that the present invention applies equally regardless of the particular type of signal-bearing media actually used to carry out the distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 702. In any case, it is to be appreciated that at least some of the elements of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the teachings of the invention provided herein, one of ordinary skill in the art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing data for use in a database server in a distributed system, the method comprising the steps of:

receiving data sent from an application server in the distributed system, wherein the application server executes an application associated with data stored on the database server; and processing the received data in accordance with the data stored on the database server, the processing of the received data being performed in accordance with an optimistic concurrency control process and a relaxed isolation level;

wherein the received data comprises a first data set and a second data set, the first data set being in a state representative of data at a time that the data was originally sent to the application server from the database server, the second data set being in a state representative of data at a time that the data was sent from the application server to the database server, and further wherein current data stored at the database server is updated in response to the first data set and the second data set;

further wherein a new transaction is begun at the database server upon receipt of the first data set and the second data set from the application server; and further wherein at least one of the first data set and the second data set comprise one or more serializable objects encapsulating one or more values associated with at least one non-serializable object stored on at least one of the database server and the application server.

2. The method of claim 1, wherein the updating step further comprises verifying that the current data stored at the database server is identical to the first data set and the second data set when the first data set is identical to the second data set.

3. The method of claim 1, wherein the updating step further comprises verifying that the current data stored in the database server is identical to the first data set, and updating the current data stored at the database server with the second data set, when the first data set is different than the second data set.

4. The method of claim 1, wherein the updating step further comprises creating data at the database server using the second data set when the first data set is null.

5. The method of claim 1, wherein the updating step further comprises deleting the current data stored at the database server when the second data set is null.

6. The method of claim 1, wherein the application server maintains the first data set and the second data set in accordance with a cache.

7. The method of claim 1, wherein the database server receives an indication from the application server that the first data set need not be processed.

8. The method of claim 1, wherein the database server and the application server operate in an Enterprise JavaBean (EJB) application environment.

9. The method of claim 8, wherein the application server maintains data via caching, and further wherein the caching is substantially transparent to an EJB client application.

10. The method of claim 1, wherein the new transaction is run against both the current data and the updated data.

11. A method of processing data for use in a database server in a distributed system, the method comprising the steps of:

receiving data sent from an application server in the distributed system, wherein the application server executes an application associated with data stored on the database server; and processing the received data in accordance with the data stored on the database server, the processing of the received data being performed in accordance with an optimistic concurrency control process and a relaxed isolation level;

wherein the received data comprises a data set being in a state representative of data at a time that the data was sent from the application server to the database server, and further wherein current data stored at the database server is updated in response to the received data set and data maintained at the database server in a state representative of data at a time that the data was originally sent to the application server from the database server;

further wherein a new transaction is begun at the database server upon receipt of the data set from the application server; and further wherein at least one of the first data set and the second data set comprise one or more serializable objects encapsulating one or more values associated with at least one non-serializable object stored on at least one of the database server and the application server.

12. A method of processing data for use in an application server in a distributed system, the method comprising the steps of:

executing an application associated with data stored on a database server in the distributed system;

maintaining data in accordance with the execution of the application such that an optimistic concurrency control process and a relaxed isolation level are substantially realized in accordance with the data stored on the database server; and sending to the database server a first data set and a second data set, the first data set being in a state representative of data at a time that the data was originally sent to the application server from the database server, the second data set being in a state representative of data at a time that the data was sent from the application server to the database server, wherein current data stored at the database server is updated in response to the first data set and the second data set;

wherein a new transaction is begun at the database server upon receipt of the first data set and the second data set from the application server; and further wherein at least one of the first data set and the second data set comprise one or more serializable objects encapsulating one or more values associated with at least one non-serializable object stored on at least one of the database server and the application server.

13. The method of claim 12, wherein the updating step further comprises verifying that the current data stored at the database server is identical to the first data set and the second data set when the first data set is identical to the second data set.

14. The method of claim 12, wherein the updating step further comprises verifying that the current data stored in the database server is identical to the first data set, and updating the current data stored at the database server with the second data set, when the first data set is different than the second data set.

15. The method of claim 12, wherein the updating step further comprises creating data at the database server using the second data set when the first data set is null.

16. The method of claim 12, wherein the updating step further comprises deleting the current data stored at the database server when the second data set is null.

17. The method of claim 12, wherein the application server maintains the first data set and the second data set in accordance with a cache.

18. The method of claim 12, further comprising the step of the application server providing an indication to the database server that the first data set need not be processed.

19. The method of claim 12, wherein the application server and the database server operate in an Enterprise JavaBean (EJB) application environment.

20. The method of claim 19, wherein the application server maintains data via caching, and further wherein the caching is substantially transparent to an EJB client application.

21. The method of claim 12, wherein the new transaction is run against both the current data and the updated data.

22. A method of processing data for use in an application server in a distributed system, the method comprising the steps of:

executing an application associated with data stored on a database server in the distributed system;

maintaining data in accordance with the execution of the application such that an optimistic concurrency control process and a relaxed isolation level are substantially realized in accordance with the data stored on the database server; and sending to the database server a data set being in a state representative of data at a time that the data was sent from the application server to the database server, and further wherein current data stored at the database server is updated in response to the sent data set and data maintained at the database server in a state representative of data at a time that the data was originally sent to the application server from the database server;

wherein a new transaction is begun at the database server upon receipt of the data set from the application server; and further wherein the data set comprises one or more serializable objects encapsulating one or more values associated with at least one non-serializable object stored on at least one of the database server and the application server.

23. Apparatus for processing data in a distributed system, the apparatus comprising:

a database server operative to: (i) receive data sent from an application server in the distributed system, wherein the application server executes an application associated with data stored on the database server; and (ii) process the received data in accordance with the data stored on the database server, the processing of the received data being performed in accordance with an optimistic concurrency control process and a relaxed isolation level;

wherein the received data comprises a first data set and a second data set, the first data set being in a state representative of data at a time that the data was originally sent to the application server from the database server, the second data set being in a state representative of data at a time that the data was sent from the application server to the database server, and further wherein current data stored at the database server is updated in response to the first data set and the second data set;

further wherein a new transaction is begun at the database server upon receipt of the first data set and the second data set from the application server; and further wherein at least one of the first data set and the second data set comprise one or more serializable objects encapsulating one or more values associated with at least one non-serializable object stored on at least one of the database server and the application server.

24. The apparatus of claim 23, wherein the application server maintains data in accordance with a cache.

25. The apparatus of claim 23, wherein the database server and the application server operate in an Enterprise JavaBean (EJB) application environment.

26. The apparatus of claim 23, wherein the new transaction is run against both the current data and the updated data.

27. Apparatus for processing data in a distributed system, the apparatus comprising:

a database server operative to: (i) receive data sent from an application server in the distributed system, wherein the application server executes an application associated with data stored on the database server; and (ii) process the received data in accordance with the data stored on the database server, the processing of the received data being performed in accordance with an optimistic concurrency control process and a relaxed isolation level;

wherein the received data comprises a data set being in a state representative of data at a time that the data was sent from the application server to the database server, and further wherein current data stored at the database server is updated in response to the received data set and data maintained at the database server in a state representative of data at a time that the data was originally sent to the application server from the database server;

further wherein a new transaction is begun at the database server upon receipt of the data set from the application server; and further wherein at least one of the first data set and the second data set comprise one or more serializable objects encapsulating one or more values associated with at least one non-serializable object stored on at least one of the database server and the application server.

28. Apparatus for processing data in a distributed system, the apparatus comprising:

an application server operative to: (i) execute an application associated with data stored on a database server in the distributed system; and (ii) maintain data in accordance with the execution of the application such that an optimistic concurrency control process and a relaxed isolation level are substantially realized in accordance with the data stored on the database server;

wherein the application server is further operative to send to the database server a first data set and a second data set, the first data set being in a state representative of data at a time that the data was originally sent to the application server from the database server, the second data set being in a state representative of data at a time that the data was sent from the application server to the database server, wherein current data stored at the database server is updated in response to the first data set and the second data set;

further wherein a new transaction is begun at the database server upon receipt of the first data set and the second data set from the application server; and further wherein at least one of the first data set and the second data set comprise one or more serializable objects encapsulating one or more values associated with at least one non-serializable object stored on at least one of the database server and the application server.

29. The apparatus of claim 28, wherein the application server maintains data in accordance with a cache.

30. The apparatus of claim 28, wherein the application server and the database server operate in an Enterprise JavaBean (EJB) application environment.

31. The apparatus of claim 28, wherein the application server is an edge server.

32. Apparatus for processing data in a distributed system, the apparatus comprising:

an application server operative to: (i) execute an application associated with data stored on a database server in the distributed system; and (ii) maintain data in accordance with the execution of the application such that an optimistic concurrency control process and a relaxed isolation level are substantially realized in accordance with the data stored on the database server;

wherein the application server is further operative to send to the database server a data set being in a state representative of data at a time that the data was sent from the application server to the database server, and further wherein current data stored at the database server is updated in response to the sent data set and data maintained at the database server in a state representative of data at a time that the data was originally sent to the application server from the database server;

further wherein a new transaction is begun at the database server upon receipt of the data set from the application server; and further wherein the data set comprises one or more serializable objects encapsulating one or more values associated with at least one non-serializable object stored on at least one of the database server and the application server.

33. An article of manufacture for processing data for use in a database server in a distributed system, comprising a machine recordable medium containing one or more programs which when executed implement the steps of:

receiving data sent from an application server in the distributed system, wherein the application server executes an application associated with data stored on the database server; and processing the received data in accordance with the data stored on the database server, the processing of the received data being performed in accordance with an optimistic concurrency control process and a relaxed isolation level;

wherein the received data comprises a first data set and a second data set, the first data set being in a state representative of data at a time that the data was originally sent to the application server from the database server, the second data set being in a state representative of data at a time that the data was sent from the application server to the database server, and further wherein current data stored at the database server is updated in response to the first data set and the second data set;

further wherein a new transaction is begun at the database server upon receipt of the first data set and the second data set from the application server; and further wherein at least one of the first data set and the second data set comprise one or more value objects encapsulating one or more state variables associated with at least one non-serializable object stored on at least one of the database server and the application server.

34. An article of manufacture for processing data for use in an application server in a distributed system, comprising a machine recordable medium containing one or more programs which when executed implement the steps of:

executing an application associated with data stored on a database server in the distributed system; and maintaining data in accordance with the execution of the application such that an optimistic concurrency control process and a relaxed isolation level are substantially realized in accordance with the data stored on the database server; and sending to the database server a first data set and a second data set, the first data set being in a state representative of data at a time that the data was originally sent to the application server from the database server, the second data set being in a state representative of data at a time that the data was sent from the application server to the database server, wherein current data stored at the database server is updated in response to the first data set and the second data set;

wherein a new transaction is begun at the database server upon receipt of the first data set and the second data set from the application server; and further wherein at least one of the first data set and the second data set comprise one or more value objects encapsulating one or more state variables associated with at least one non-serializable object stored on at least one of the database server and the application server.

35. The article of claim 34, wherein the new transaction is run against both the current data and the updated data.

* * * * *